Sept. 21, 1965   R. W. WARREN   3,207,168
FLUID VORTEX TRANSFER
Filed Jan. 16, 1963   4 Sheets-Sheet 1
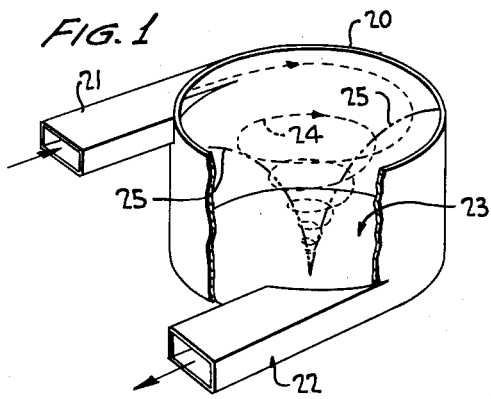
FIG. 1
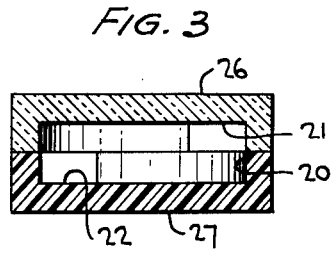
FIG. 3
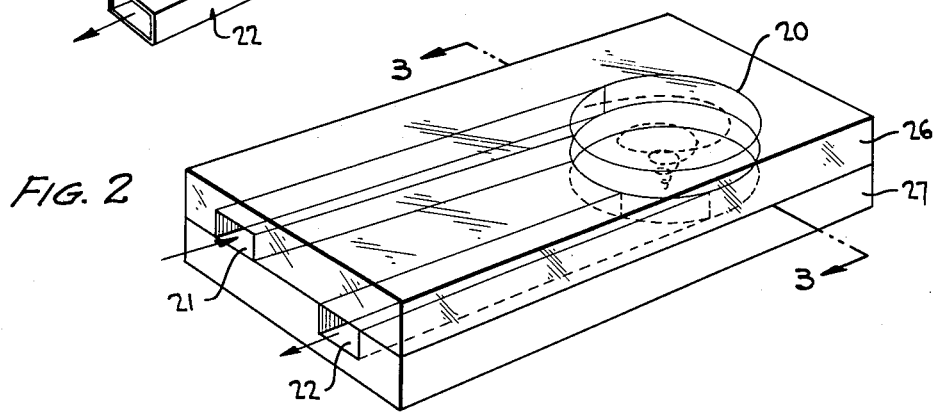
FIG. 2
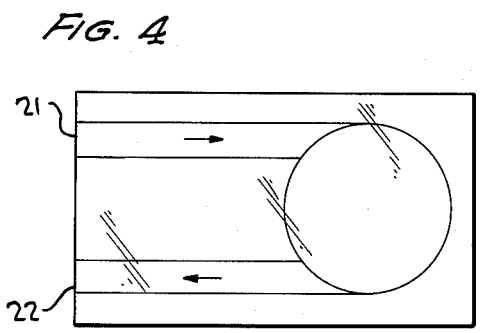
FIG. 4
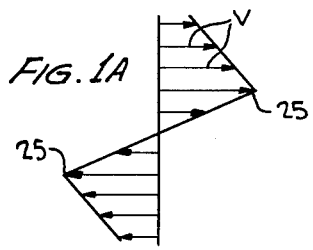
FIG. 1A
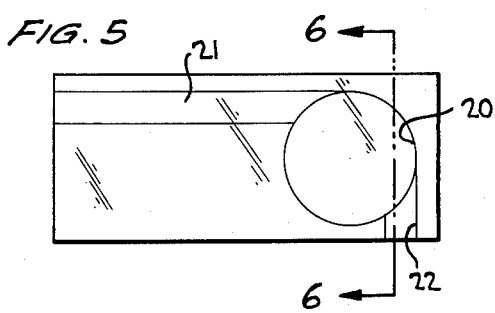
FIG. 5
FIG. 6
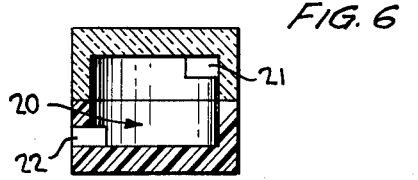
INVENTOR,
RAYMOND W. WARREN
BY S. J. Rotondi, A. J. Dupont
& J. D. Edgarton
ATTORNEYS Sept. 21, 1965 R. W. WARREN 3,207,168
FLUID VORTEX TRANSFER
Filed Jan. 16, 1963 4 Sheets-Sheet 2
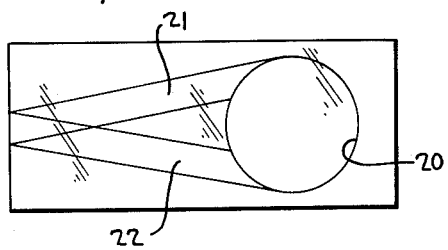
FIG. 7
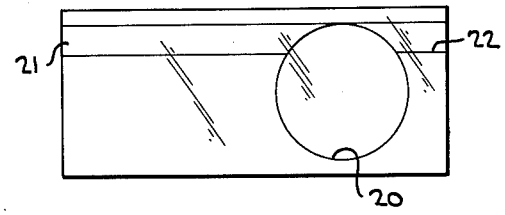
FIG. 8
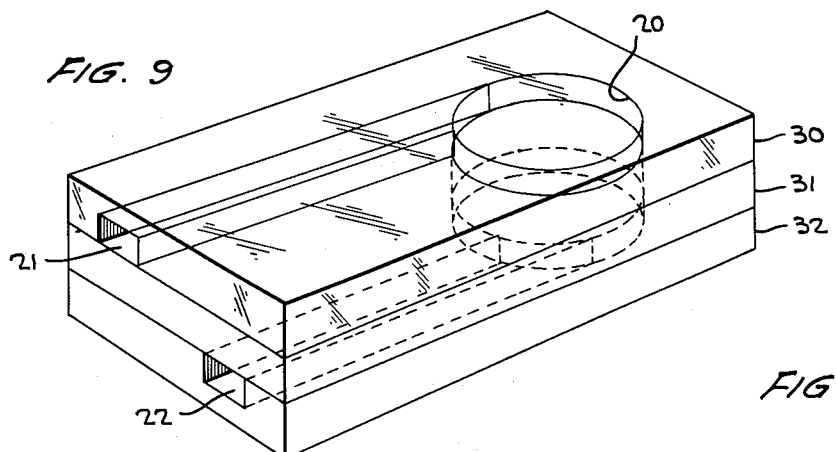
FIG. 9
FIG. 10
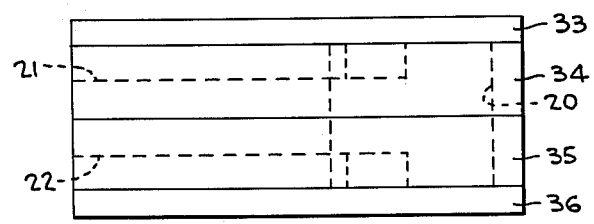
FIG. 12
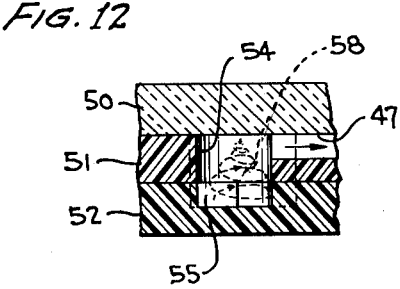
INVENTOR,
RAYMOND W. WARREN
BY S. J. Rotondi, A. J. Dupont
& J. P. Edgerton
ATTORNEYS Sept. 21, 1965

R. W. WARREN 3,207,168

FLUID VORTEX TRANSFER

Filed Jan. 16, 1963

INVENTOR,

RAYMOND W. WARREN

BY *S. J. Rotondi, A. J. Dupont*
*& J. P. Edgerton*   ATTORNEYS 3,207,168
FLUID VORTEX TRANSFER
Raymond W. Warren, McLean, Va., assignor to the United States of America as represented by the Secretary of the Army
Filed Jan. 16, 1963, Ser. No. 251,988
10 Claims. (Cl. 137—81.5)
(Granted under Title 35, U.S. Code (1952), sec. 266)

The invention described herein may be manufactured and used by or for the Government for governmental purposes without the payment to me of any royalty thereon.

This invention relates generally to a unit for providing a low energy loss transfer of linear flow between two planes of flow, and more specifically this invention relates to a device for use in a pure fluid system for providing an impedance match to the system.

Recently pure fluid systems have been developed which employ only moving fluid and require no moving mechanical parts to achieve such functions as amplification, oscillation and computer logic. Because of the absence of any moving mechanical parts, these systems have been properly designated by those working in the art as "pure fluid systems" and in certain instances such systems can replace mechanical systems employing moving parts or electronic systems if the latter systems perform analogous functions to those which can be performed by a pure fluid system.

Typical pure fluid systems are, for example, disclosed in U.S. Patents 3,016,066 and 3,024,805. As will be evident from an examination of the aforementioned patents the pure fluid system is generally formed by a plurality of flat plates, either two or three plates, the plates being sandwiched together and sealed fluid-tight one to the other by adhesives, machine screws, clamps or other suitable means. In the case of a two plate sandwich structure, one plate is molded, milled, or otherwise cut into the configuration needed to form the pure fluid amplifier or pure fluid oscillator as the case may be, and this plate is covered by another flat plate so that the flow in the resulting unit is confined by the plates. When three plates are used, the middle plate is usually stamped out, etched or otherwise formed into the desired configuration and the flat plates on either side of the middle plate are sealed fluid-tight to the middle plate so as to provide essentially planar top and bottom walls for confining the flow in the configuration formed in the middle plate.

The aforedescribed sandwich-type structure is commonly used in pure fluid systems primarily because this type of structure can be readily formed and the components comprising an entire pure fluid system can be sandwiched together to connect or stage the components.

As exemplified by the hereinabove referred to patents, the tubes which either supply the fluid to the pure fluid system or receive the fluid from the amplifying system generally extend perpendicular to the plane of the sandwich type structure and the diameter of the tube is substatnially equal to the width of the passageway or nozzle to which it is connected. When a plurality of pure fluid systems are staged by stacking the systems together, it is common practice in the art to connect the output passages of one system to the input passages of another system by common orifices having a diameter essentially equal to the width of the passages interconnected. In the event a common connecting orifice cannot be used, tubes are generally employed to effect staging between the output of one pure fluid unit and the input of another fluid unit forming the sandwich-type structure. Any of these connections is therefore basically designed to transfer the linear flow perpendicularly from one plane to another plane at a different level to said one plane from passages or ducts having diameters or widths substantially equal to the diameters or widths of the tube, orifice or passage to which they are connected. This type of transfer involves two substantially right angle changes of flow direction as each additional stage is connected to the system.

As is known to those working in the pure fluid systems and related arts, if a moving column of fluid meets an abrupt discontinuity in the system, a reflected wave will be produced which travels the length of the column of fluid as a sinusoidal wave that tends to cause oscillation of the fluid in the column. An abrupt discontinuity may take the form of a relatively abrupt change of flow direction, as for example, by a right angle bend between a passage and a tube or pipe; or by an abrupt change of pressure between the fluid in the tube or pipe and the pressure of the region with which the fluid discharges; as for example, by fluid under a relatively high pressure in a pipe exhausting from an open end in the pipe to a region at ambient pressure; or by impediment in the fluid flow path, as for example, by a tube end protruding into a passage.

An abrupt discontinuity in a fluid system reflects shock waves which create oscillations in the fluid flowing in the passage, orifice or tube in the same manner that a pipe organ produces standing waves in the air columns in each pipe; that is, nodes or antinodes are produced by the abrupt discontinuity which cause fundamental overtone oscillations in the fluid column. As will be appreciated by those working in the art, oscillating shock waves created by abrupt discontinuities are usually undesirable in pure fluid systems because they may produce high levels of noise or cause the system to go into unanticipated oscillation.

It has been observed that smooth transfer of fluid between regions of different pressures may be achieved by applying the fluid as tangential flow at the periphery adjacent one end of a hollow cylinder and withdrawing the fluid at the other end of the cylinder. The manner of application of the fluid produces rotational flow in the cylinder and it has been found that if the energy of the input stream is sufficient to produce flow in the system and the axial length of the cylinder is sufficient to permit the necessary flow patterns to be established, smooth flow transitions between two passages in a system or between a passage and the atmosphere is always achieved.

Broadly, therefore, it is an object of this invention to provide a pure fluid vortex transfer device for incorporation in a pure fluid amplifying system to provide impedance matching of fluid input and output signals.

Another object of this invention is to provide a device for effecting low energy loss transfer of linear flow perpendicularly from first level to a second level.

Another object of this invention is to provide a vortex transfer device for use in pure fluid system for transferring fluid perpendicularly from a duct at one level to a duct at another level within the system with low energy loss and impedance matching.

Still another object of this invention is to provide a fluid vortex transfer device for transferring fluid flow in one direction and at one level to fluid flow in another direction and at another level with negligible energy loss and with impedance matching.

The above and still further objects, features and advantages of the present invention will become apparent upon consideration of the following detailed description of one specific embodiment thereof, especially when taken in conjunction with the accompanying drawings, wherein:

FIGURE 1 illustrates a partial sectional perspective view of a vortex chamber for impedance matching the flows and pressures in two ducts;

FIGURE 1A is a velocity diagram of the fluid flow in a typical vortex chamber;

FIGURE 2 shows an arrangement of a vortex chamber in a pair of plates embodying inlet and egress ducts;

FIGURE 3 is a cross-sectional end view of FIGURE 2, taken on line 3—3 of that figure;

FIGURE 4 is a plan view of FIGURE 2, showing a typical flow pattern in a vortex chamber;

FIGURE 5 illustrates another embodiment of this invention wherein the longitudinal axes of the ingress and egress ducts are positioned substantially at right angles with respect to each other;

FIGURE 6 is a sectional end view of FIGURE 5 taken on section line 6—6 of that figure;

FIGURE 7 illustrates another embodiment of a fluid vortex transfer unit constructed in accordance with this invention, wherein the inlet and egress extend tangentially from a vortex chamber and terminate in a vertically aligned relationship at one end of the unit;

FIGURE 8 illustrates another embodiment of the fluid vortex transfer unit in accordance with this invention illustrating aligned, coextensive ingress and egress ducts;

FIGURE 9 illustrates a three plate sandwich structure embodying a fluid vortex chamber and ingress and egress ducts extending tangentially from the vortex chamber;

FIGURE 10 illustartes a four plate sandwich structure embodying a fluid vortex chamber and ingress and egress ducts extending tangentially from that chamber.

Figure 11:
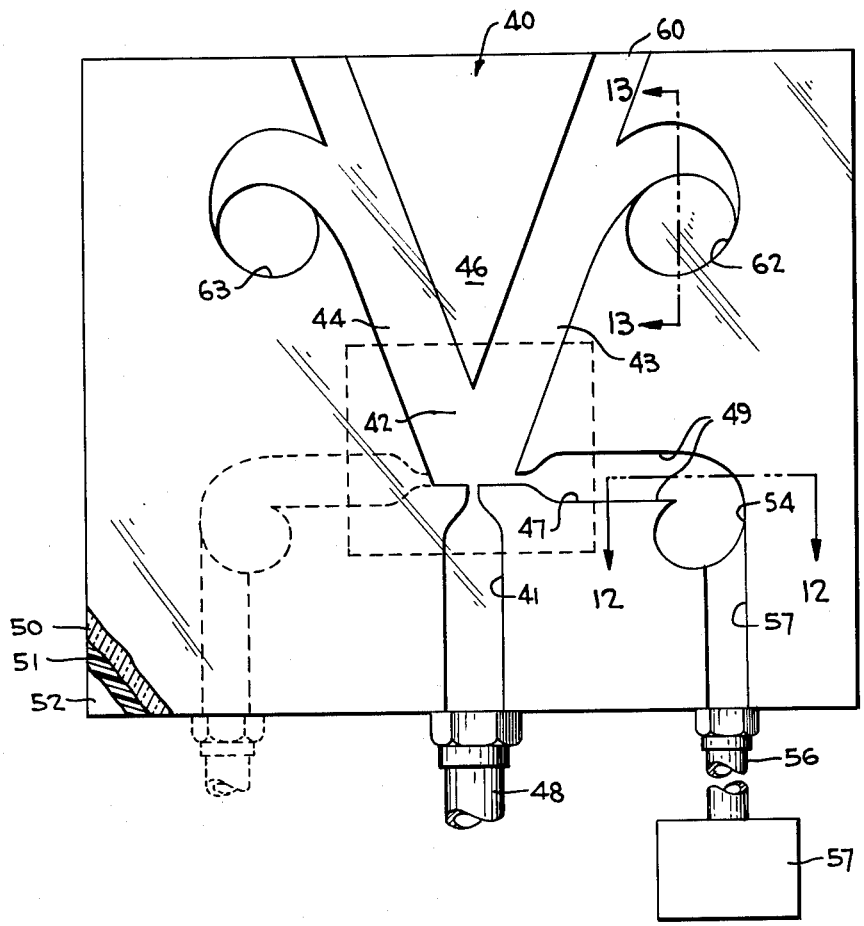
Figure 13:
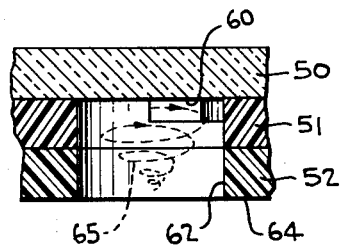
Figure 14:
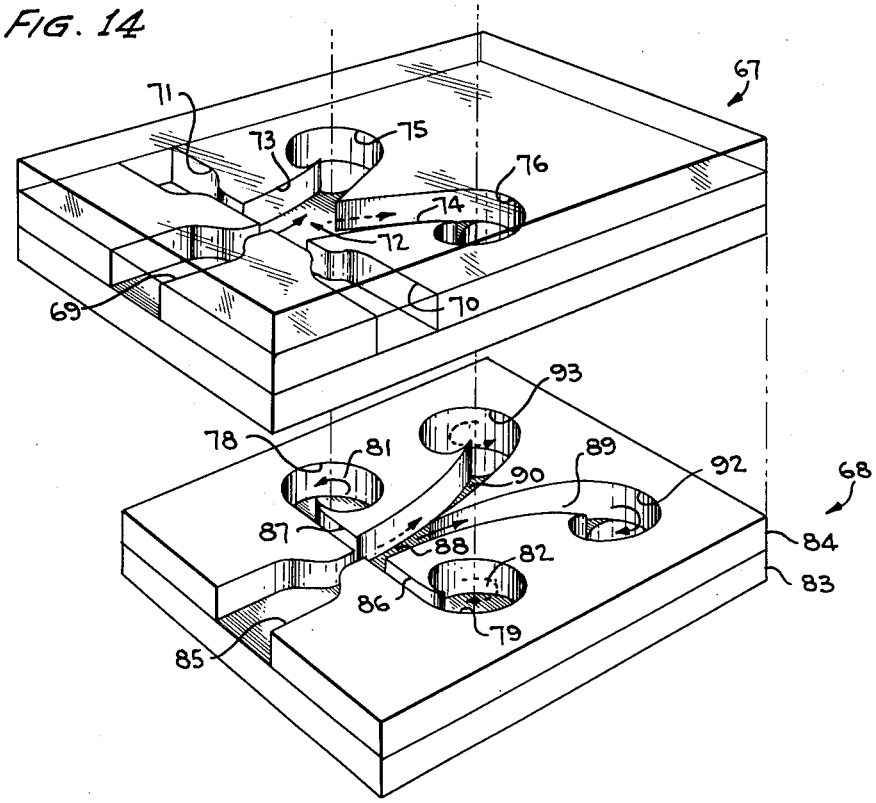
Figure 15:
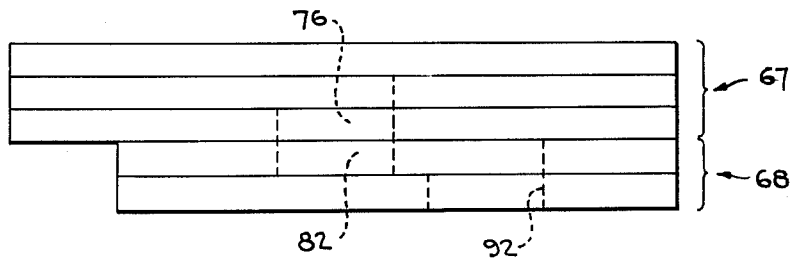

FIGURE 11 illustrates a pure fluid amplifying system modified in accordance with the concepts and teachings of this invention;

FIGURE 12 is a sectional side view of FIGURE 11 taken on section line 12—12 of FIGURE 11;

FIGURE 13 is a sectional side view of FIGURE 11 taken on section line 13—13 of that figure;

FIGURE 14 is a perspective view of a pair of pure fluid amplifiers illustrating the use of vortex transfer for providing a fluid connection between the amplifiers when the amplifiers are staged; and FIGURE 15 is a side view showing the amplifiers of FIGURE 14 staged together.

Referring now to FIGURE 1 of the accompanying drawings for a more complete understanding of the present invention, there is shown a cylindrical vortex chamber designated by the numeral 20, having a pair of ducts 21 and 22 of substantially rectangular cross-section extending tangentially from the periphery of the chamber 20. The ducts 21 and 22 are positioned adjacent opposite ends of the chamber 20 and as depicted, the duct 21 supplies fluid substantially tangentially to the interior wall of the chamber 20, and the duct 22 is positioned to receive the tangential velocity component of the fluid egressing from an oppoiste end of the chamber 20. While the ducts 21 and 22 are shown as having a rectangular cross section shape, it will be understood that the ducts 21 and 22 may have other cross-sectional shapes such as circular, oval or square.

The applicant believes that the following theory of operation of his device is correct although he does not intend to be limited to any specific theory of operation but only to the structures which achieve the desired results.

It is well known that in a fluid flow system $P_1V_1 = P_2V_2$ where $P_1$ and $P_2$ are the static pressures at two distinct locations along a continuous flow path and $V_1$ and $V_2$ are the velocities at these locations respectively. Referring to FIGURE 1, if the pressures and velocities respectively at the entrances to ducts 21 and 22 are the same, then the fluid in the chamber 20 rotates as a solid body and there are no pressure or velocity changes in the system. That, of course, assumes a lossless system.

If the pressure at duct 21 is less than the pressure at the outlet or duct 22, a vortical flow pattern is established in the chamber 24. The tangential velocity of the fluid along the wall of chamber 20 decreases due to friction and other effects to be discussed. Specifically, there are two distinct types of flow present in chamber 20. The first type of flow is solid-body rotation and this occurs in a central portion of the cylinder bounded in cross-section by exponential curves 25 defined by equation $Y = e^{ax}$ wherein $a$ is a constant and wherein $x$ is the distance between centerline taken through the exponential surface of revolution. The flow outside of the portion defined by the surface of revolution of curves or lines 25 exhibits vortical flow. FIGURE 1a illustrates a diagram of the velocities in a horizontal section of the chamber with the vectors V having lengths directions corresponding to the magnitude and direction of velocity.

With regard to the portion exhibting solid body rotation, all points in this region rotate at the same angular velocity so that the tangential (circumferential) velocities of the portions close to the center of the cylinder are considerably less than the input tangential velocity. It will be noted that only regions of low velocity exist at the bottom of the chamber 20. The flow about the central portion defined by lines 25 in cross-section, exhibits vortical flow; and as such, the larger the radius, the lower the tangential velocity. This represents a reversal of conditions inside of lines 25 as indicated in FIGURE 1a. Due to the shape of the exponential curve, the radius over which the vortical flow is effective increases and the tangential velocity along the wall of the chamber 20 decreases accordingly. Thus, with a chamber 20 of a certain minimum axial length, velocity and pressure matching occur and correct impedance matching is obtained.

It is of interest to note that the exponential lines or curves 25 is of the same slope as the horn of a trumpet and other types of brass instruments and the woodwinds, the so-called "trumpet shape" being employed for impedance matching of sound waves generated by the instrument to the surrounding atmosphere.

If the static pressure at the duct 21 is greater than the static pressure at the duct 22, but the energy of the stream applied to duct 21 is sufficient to produce a net flow towards the duct 22, then a solid body configuration results, FIGURE 12, which is upside down relative to that illustrated in FIGURE 1.

If the entire bottom of the chamber were open under similar conditions, the exponential curve would match the atmospheric pressure at the periphery. The region between the periphery of the column and the exponential curve provides a gradual matching as the flow decelerates. Assuming that the chamber 20 is being used in a gaseous environment and that fluid supplied to the vortex chamber 20 is a liquid, the region 24 will be gaseous and be bounded by the fluid having an inner surface forming the exponential lines or curves 25. When the fluid employed in the chamber 20 is gaseous the region 24 will also be gaseous and of exponential shape.

If the inlet and egress ducts 21 and 22 were not disposed tangentially of the chamber 20 or if the region 24 were not created in the chamber 20 an abrupt discontinuity would probably be created in the chamber 20 by differentials in pressures in the ducts 21 and 22 and these differentials in pressure would produce oscillations in the chamber 20 similar to the abrupt discontinuities that are intentionally created in the tubes of pipe organs. Such oscillations tend to reflect back into the ducts 21 and 22 and create undesirable oscillatory conditions in the system or systems to which the ducts are conected. The length of the chamber 20 can generally be varied as required by the system in which the chamber is to be incorporated, the only limitation being that the distance along the axis of chamber symmetry between the center of the inlet duct and the center of the outlet duct be large enough so that the exponentially shaped region 24 is formed by the vortical flow. In general, the greater the ratio of the length of the chamber 20 to the diameter of the chamber, the longer the region 24 and the better the impedance match between the input and output tubes or ducts. The length of the exponential region varies automatically as the length of the vortex chamber 20 varies and as the pressures at either end of the region varies, or as the pressures at the inputs and outputs vary. Assuming a region of at least some predetermined length, the region will always try to effect a pressure and velocity match between the input and output tubes or ducts.

In addition to the effectuation of impedance matching by the vortex chamber 20, the chamber 20 also provides the transfer of flow from a first plane to a second plane at a different level with respect to the first plane and with a minimum of turbulence and energy loss. If the ingressing and egressing fluids were not supplied tangentially and received tangentially from the vortex chamber 20, the turbulence created within the chamber 20 would produce relatively high energy losses in the system in which the vortex chamber and the associated ducts are incorporated. The turbulence so created would also tend to produce undesirable oscillations in the fluid being transferred.

Referring now to FIGURES 2, 3 and 4 of the accompanying drawings, the vortex chamber 20 and the ducts 21 and 22 may be embodied between two flat plates 26 and 27 which are sealed fluid-tight one to the other by adhesives, machine screws, clamps or any other suitable means. The ends of the vortex chamber 20 may be formed by countersinking bores in the plates 26 and 27, as shown in FIGURE 3, and the ducts 21 and 22 may be formed in the plates 26 and 27, respectively, by milling, molding or by other suitable operations. Fluid entering the duct 21 tangentially is received by the vortex chamber 20, and the tangential velocity component of the vortical flow in the chamber 20 enters the duct 22 and issues as essentially linear flow from that duct. In the embodiment illustrated in FIGURES 2, 3 and 4 inclusive, the linear flow is shown to be reversed 180° in direction, however, the relative angular positions of the axes of the ducts 21 and 22 relative to the axis of symmetry of the vortex chamber 20 is ordinarily a matter of choice determined by the particular application in which the vortex transfer unit is to be embodied.

FIGURES 5 and 6 of the accompanying drawings illustrate the position of the ducts 21 and 22 when the longitudinal axes of the ducts are at approximately right angles with respect to each other, and FIGURE 7 illustrates the relative position of the ducts 21 and 22 when the ducts are in different planes and when the entrances or exits of the ducts are in alignment. FIGURE 8 illustrates a fluid vortex transfer unit wherein the longitudinal axes of the ducts 21 and 22 are coaligned.

As should be evident, it is essential only that the duct openings which communicate with the interior of the vortex chamber 20 extend tangentially from the vortex chamber so that the tangential velocity component of vortical flow enters the duct which is to receive the flow, and that the length of the vortex chamber be sufficient to permit the generation of the impedance matching region 24 of exponential function shape.

FIGURE 9 illustrates an embodiment wherein the vortex chamber 20 and the associated ducts 21 and 22 are embodied in a sandwich structure of three plates designated by numerals 30, 31 and 32, sealed fluid-tight one to the other. The plates 20 an 32 are countersunk to provide opposite ends of the vortex chamber 20, and the plate 31 is bored through to provide the central section of the vortex chamber 20. The plates 30 and 32 are milled, molded or otherwise shaped to form the ducts 21 and 22 therein that extend tangentially from the vortex chamber 20, for reasons discussed hereinabove.

FIGURE 10 illustrates another embodiment of the fluid vortex transfer unit which comprises four plates 33, 34, 35 and 36 sealed fluid-tight one to the other. The plates 34 and 35 are bored to form the vortex chamber 20 and cut, moled or otherwise shaped to form the ducts 21 and 22. The plates 33 and 36 form planar surfaces for the ducts 21 and 22 and the ends of the vortex chamber 20. Since a countersinking operation is not required in the manufacture of this fluid transfer unit, the unit can be inexpensively constructed.

FIGURE 11 illustrates a pure fluid system 40 which has been modified in accordance with the concepts of this invention to provide impedance matching and fluid transfer without appreciable energy loss. The system 40 comprises a power nozzle 41, an interaction chamber 42, output passages 44 and 45, a flow splitter 46, and a control nozzle 47. These elements are shown enclosed by the dotted line block in FIGURE 11, and form a conventional pure fluid amplifier such as disclosed in U.S. Patents 3,024,805 and 3,039,490. As shown in FIGURES 12 and 13, the system 40 is preferably formed by three flat plates 50, 51 and 52 sealed fluid tight one to the other. The power nozzle 41 receives a power stream from a tube 48 threadedly connected at one end thereof to communicate with the power nozzle 41.

For the purpose of illustrating the operation of the system 40, it may be assumed that the power stream is directed into the output passage 43 in the absence of control stream flow from the control nozzle 47. Those skilled in the art will be able to design the unit 40 so that the power stream issues only from the output passage 43 unless the control nozzle 47 issues control jet that interacts with the power stream to effect amplified directional displacement of the power stream from the output passage 43 into the output passage 44. Alternatively a second control nozzle as indicated by the dotted lines in FIGURE 11 could be provided to displace the power stream into the passage 43 by directing a control stream into interaction with the power stream.

A duct 49 of rectangular cross section is formed in the plate 51 and extends from the control nozzle 47 and from a cylindrical chamber 54, FIGURE 12, formed in the plates 51 and 52. A duct 55 is formed in the flat plate 52 and extends tangentially from the chamber 54. A tube 56 is threadedly connected at one end thereof in the upstream end of the duct 55 and supplies a fluid control input signal from a source 57 of control flow to the duct 55. Since the ducts 49 and 55 extend tangentially from the interior of the chamber 54 a linear type fluid control input signal received from the tube 49 is converted to vortical flow by the chamber 54, as shown in FIGURE 12, and an exponential curve 58 is formed centrally in the vortical flow pattern as shown. The control nozzle 47 receives a portion of the tangential velocity component of the fluid rotating in the chamber 54, the fluid being converted to linear flow by the duct 49 which issues from the control nozzle 47 to effect amplified directional displacement of the power stream egressing from the nozzle 41 from the output passage 43 to the output passage 44. The vortex chamber 54 thereby effects a negligible energy loss transfer from one level to another in the unit 40 since friction and stream turbulence are minimized by the vortex transfer, and the region 58 of exponential shape automatically matches the impedance between differentials in pressure in the control nozzle 47 and the supply 57 so that oscillations are not generated between the control nozzle 47 and the supply 57.

Located downstream of the passages 43 and 44 are passages 60 and 61, the passages 60 and 61 being designed to scoop off a portion of the fluid stream entering either the output passage 43 or the output passage 44, respectievly. The passages 60 and 61 communicate tangentially with the cylindrical chambers 62 and 63 respectively, each chamber being formed in the plates 51 and 52, FIGURE 13. Since the downstream end 64 of the vortex chamber 62, for example, is open to atmospheric or ambient pressure and since the pressure of the fluid in the passages 60 will be greater than ambient pressure, and abrupt discontinuity would be created by the differential between the two pressure levels. The exponentially curved region 65 created in the vortex chamber 62 impedance matches the pressures in the output passages 60 and 61 to that of ambient pressure so that the output passages 43 and 44 will not receive reflected oscillations from the output passages 60 and 61, respectively, which might otherwise cause the power stream in the unit 40 to oscillate between the output passages 43 and 44. Similarly, and for the same reasons discussed hereinabove with regard to the function of the vortex chamber 62, the vortex chamber 63 which has one end thereof open to ambient pressure effects impedance matching between the output passage 44 and the ambient pressure condition.

It is also possible to design the unit 40 so that the passages 60 and 61 form complete extensions of the output passages 43 and 44 respectively, so that the fluid vortex chambers 62 and 63 respectively receive all fluid from the output passages associated therewith. For example, if it is desired to stage one pure fluid system to a second pure fluid system by sandwiching the units together, the vortical flow from the vortex chambers 62 and 63 of one stage may be received by vortex chambers similiar to the chamber 54 of the second stage, and converted into linear control signals by ducts extending tangentially from the vortex chambers embodied in the second stage.

FIGURE 14 illustrates two pure fluid amplifying systems, referred to generally by the numerals 67 and 68 which are positioned one under the other for staging. The system 67 as illustrated, includes a power nozzle 69, a pair of control nozzles 70 and 71, a stream interaction chamber 72 and output passages 73 and 74 respectively. A pair of cylindrical vortex chambers 75 and 76, respectively, tangentially receive the power stream from the nozzle 69 which is displaced as indicated by the solid and dotted lines by control streams egressing from the control nozzles 70 and 71 respectively into the passages 73 and 74 respectively. The vortex chambers 75 and 76 convert these substantially linear streams into vortical flows which are supplied directly to cylindrical vortex chambers 78 and 79, respectively, formed in the system 71 which are aligned with the chambers 75 and 76 respectively when the systems 67 and 68 are staged. The vortical flow from the vortex chambers 75 and 76 impinges against the planar bottom surfaces 81 and 82, respectively of the vortex chambers 78 and 79, respectively, the surfaces 81 and 82 being formed by the upper surface of a flat plate 83 which is sealed fluid tight to a similar flat plate 84 having the necessary configuration as shown, to form a pure fluid amplifying system.

The system 68 includes, as does the system 67, a power nozzle 85, a pair of control nozzles 86 and 87 respectively which communicate with the sidewalls of an interaction chamber 88, and a pair of output passages 89 and 90, respectively, for receiving fluid from the interaction chamber 88. A pair of vortex chambers 92 and 93, respectively, receive linear, displaced fluid streams flowing in output passages 89 and 90, respectively, tangentially of the inner peripheral walls defining the chambers 92 and 93 so that the linear flow is converted to vortical flow by these vortex chambers. The nozzles 86 and 87 receive the tangential velocity component of vortical flow supplied to the vortex chambers 79 and 78 respectively, and convert the vortical flow to defined linear control streams which egress into the interaction chamber 88 to effect amplified directional displacement of the power jet issuing from the power nozzle 85 as indicated by the solid and dotted lines. The vortex chambers 92 and 93, respectively, receive the displaced, linear fluid streams issuing from the interaction chamber 88 and convert these streams into vortical streams which may egress from the system 68 to supply control streams for other amplifying stages or to other types of fluid systems, as will be evident. The power nozzles 69 and 85 may receive power streams from the same or different source having the same or different magnitudes. Power amplification can be achieved by increasing the magnitude of the power stream supplied to each successive amplifying stage and by successively increasing the ratio between the widths of the orifices of the power nozzles 69 and 85, respectively.

FIGURE 15 illustrates the sandwich structure resulting from the stacking of the systems 67 and 68 together so that staging is achieved by the two streams. The number of stages which are provided will, of course, depend upon the amplification factor desired of the resulting system.

Although the vortex chamber has been hereinabove described as cylindrical, the longitudinal axis of the chamber may be angularly disposed with respect to a vertical axis taken centrally through the chamber, or the interior wall sections forming the chamber may be in slight misalignment with respect to each other.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A device for providing impedance matching to a pure fluid system comprising a substantially cylindrical chamber, said chamber being enclosed at one end thereof and open at the other end, a duct extending subtsantially tangentially from the periphery of said chamber adjacent said one end thereof for issuing fluid tangentially into said chamber so as to create a vortical flow in said chamber, the other end of said chamber being open to a lower pressure condition than that in said duct, said chamber being constricted such that the vortical flow therein has a central region, the central region being a surface of revolution about the longitudinal axis of said cylindrical chamber and bounded by a curve which conforms to an exponential function.

2. A device for providing impedance matching in a fluid system comprising an enclosed, substantially cylindrical vortex chamber for creating vortical flow therein, plural substantially parallel ducts extending tangentially from the periphery of said vortex chamber and communicating with the interior thereof at least one duct being positioned adjacent each end of said chamber for supplying fluid to and receiving fluid from said chamber, said chamber having a length such that the vortical flow created in said chamber forms a central region, the central region being a surface of revolution about the longitudinal axis of said cylindrical chamber and bounded by a curve which conforms to an exponential function.

3. The device as claimed in claim 2 wherein the longitudinal axis of at least one duct located adjacent one end of said chamber is positioned at an angle to the longitudinal axis of another duct located adjacent the other end of said chamber.

4. A pure fluid amplifying system including an interaction chamber, a power nozzle for issuing a power stream into one end of said chamber, a control nozzle for issuing a control stream in interacting relationship with said power stream in said interaction chamber, means for generating a control flow of fluid and vortical flow means positioned between said control nozzle and said means for generating for matching the impedance of said means for generating to said control nozzle.

5. In a pure fluid system including an interaction chamber, a power nozzle for issuing a power stream into one end of said chamber, a control nozzle for issuing a control stream in interacting relationship with said power stream for effecting amplified directional displacement thereof, plural passages located downstream of said interaction chamber for receiving fluid therefrom, and a fluid receiving region for receiving fluid from at least one of said plural passages, the improvement comprising: impedance matching means connected between said at least one of said plural passages and said fluid receiving region, said impedance matching means including a vortical flow means.

6. In combination, nozzle for use in a fluid system, means for supplying fluid to said nozzle, and a device for impedance matching the fluid flowing between said means and said nozzle, said device including a vortex chamber of substantially cylindrical shape device having two ends and an axis of symmetry, a first duct extending substantially tangentially from the periphery of said chamber adjacent one end thereof and communicating with said chamber and said nozzle, a second duct extending substantially tangentially from the periphery of said chamber and located adjacent the other end of said chamber, said first and second ducts having substantially parallel longitudinal axes, said first duct supplying fluid tangentially to said chamber and said second duct receiving the tangential velocity component of fluid flow from said chamber, said chamber being constructed such that a region is formed centrally of the vortical flow created in said chamber, the central region being a surface of revolution about the longitudinal axis of said cylindrical chamber and bounded by a curve which conforms to an exponential function.

7. A pure fluid system including an interaction chamber, a power nozzle for issuing a defined power stream into one end of said chamber, a control nozzle for issuing a control stream into said interaction chamber in interacting relationship with said power stream, plural output passages located downstream of said interaction chamber for receiving fluid therefrom and discharging the fluid so received into a region of lower pressure, and vortical flow means communicating with at least one of said passages for providing a matched impedance between the fluid pressure in said one of said passages and the region of lower pressure.

8. The pure fluid system as claimed in claim 7 wherein said means includes a duct for intercepting and receiving a portion of the fluid flow in said passage and a substantially cylindrical vortex chamber tangentially connected to said duct for receiving fluid therefrom, said chamber being closed at one end and open at the other end opposite said one end to said region the length of said vortex chamber being such that the vortical flow created in said cylindrical chamber generates a central region, the central region being a surface of revolution about the longitudinal axis of said cylindrical chamber and bounded by a curve which conforms to an exponential function.

9. A fluid system, comprising at least two pure fluid amplifiers each amplifier including at least one output passage and at least one of said amplifiers including a control nozzle, and vortical flow means coupling the output passage of one of said fluid amplifiers to the control nozzle of the other fluid amplifier for effecting an impedance match therebetween.

10. The fluid system as discussed in claim 9, wherein said vortical flow means comprises a substantially cylindrical vortex chamber for tangentially receiving the fluid from said output passage of said one amplifier and for issuing the fluid received tangentially into said control nozzle of said other amplifier.

References Cited by the Examiner

UNITED STATES PATENTS

| 3,075,227 | 1/63 | Bowles | 15—346 |
| 3,075,548 | 1/63 | Horton | 137—597 X |

FOREIGN PATENTS

| 727,647 | 3/32 | France. |
| 790,067 | 9/35 | France. |
| 561,873 | 10/32 | Germany. |

M. CARY NELSON, *Primary Examiner.*

LAVERNE D. GEIGER, *Examiner.*